United States Patent [19]

Maucher et al.

[11] Patent Number: 4,883,153
[45] Date of Patent: Nov. 28, 1989

[54] FRICTION CLUTCH

[75] Inventors: Edmund Maucher, Wooster, Ohio; Lothar Huber, Bühl, Fed. Rep. of Germany; Kurt Frietsch, Bühlertal, Fed. Rep. of Germany; Paul Maucher, Sasbach, Fed. Rep. of Germany

[73] Assignee: Luk Lamellen und Kupplungsbau GmbH, Bühl, Fed. Rep. of Germany

[21] Appl. No.: 134,326

[22] Filed: Dec. 17, 1987

[30] Foreign Application Priority Data

Dec. 17, 1986 [DE] Fed. Rep. of Germany ....... 3643109

[51] Int. Cl.4 ...................... F16D 13/44; F16D 13/58
[52] U.S. Cl. .................................. 192/70.27; 192/89 B
[58] Field of Search ................ 192/70.27, 89 B, 89 R, 192/70.18

[56] References Cited

U.S. PATENT DOCUMENTS

| 2,641,344 | 6/1953 | Banker | 192/89 B X |
| 3,317,013 | 5/1967 | Smirl | 192/70.18 |
| 3,871,499 | 3/1975 | Kazuma | 192/70.18 X |
| 3,981,381 | 9/1976 | Nosek | 192/70.18 |
| 4,562,636 | 1/1986 | Carmillet | 192/89 B X |
| 4,570,772 | 2/1986 | Alas et al. | 192/70.18 |
| 4,611,701 | 9/1986 | Friedmann | 192/110 B |
| 4,655,333 | 4/1987 | Martinez-Corral | 192/70.18 X |
| 4,662,497 | 5/1987 | Cucinotta et al. | 192/70.28 |

FOREIGN PATENT DOCUMENTS

| 0208400 | 1/1987 | European Pat. Off. | 192/89 B |
| 2355825 | 5/1975 | Fed. Rep. of Germany | 192/89 B |
| 2176548 | 12/1986 | United Kingdom | 192/89 B |

Primary Examiner—Rodney H. Bonck
Attorney, Agent, or Firm—Peter K. Kontler

[57] ABSTRACT

A friction clutch wherein a first unit including the cover, the diaphragm spring and the pressure plate is separably connected to a second unit including the clutch plate and its linings by a coupling device which centers the clutch plate relative to the pressure plate and maintains the clutch plate at an optimum distance from the cover for attachment of the cover to the flywheel on the crankshaft of the engine in a motor vehicle wherein the clutch plate is to transmit torque to the input shaft of a variable-speed transmission when the clutch is engaged. The coupling device is deactivated or destroyed in response to attachment of the cover to the flywheel.

33 Claims, 7 Drawing Sheets

FRICTION CLUTCH

BACKGROUND OF THE INVENTION

The invention relates to friction clutches in general, and more particularly to improvements in methods of and in means for facilitating attachment of friction clutches to torque-transmitting and/or torque-receiving parts, e.g., in the power train between the engine and the wheels of a motor vehicle.

A friction clutch for use in motor vehicles normally comprises a cover or housing which carries a diaphragm spring serving to bias a pressure plate toward a clutch plate. The clutch plate is thereby clamped against and can receive torque from a flywheel which also rotates the cover. The flywheel can be mounted on the output shaft of the engine in a motor vehicle, and the clutch plate can be mounted on the input shaft of a variable-speed transmission so that the input shaft receives torque from the output shaft when the engine is on and the clutch is engaged. The pressure plate rotates with the flywheel and with the cover because it is secured to the cover by a set of leaf springs which enable the pressure plate to move axially of but prevent the pressure plate from turning relative to the cover and flywheel.

It is customary to pack the unit including the cover, pressure plate, leaf springs and diaphragm spring independently of the clutch plate. When such clutches are to be installed in motor vehicles, clutch plates are delivered to the production line on a first set of pallets whereas the units including the covers, pressure plates and diaphragm springs are delivered to the production line on a separate second set of pallets. It is then necessary to prepare the two units of each clutch for actual installation in a motor vehicle in that the units are unpacked and the clutch plate is centered relative to the pressure plate and other parts of the clutch. This contributes to the cost of the clutch and of installation of the clutch in a motor vehicle.

OBJECTS AND SUMMARY OF THE INVENTION

An object of the invention is to provide a method of reducing the cost of storing transporting, packing and installing friction clutches in motor vehicles and the like.

Another object of the invention is to provide novel and improved means for holding together separable units of a friction clutch prior to and even during installation in a power train or the like.

A further object of the invention is to reduce the space requirements of means for supporting and transporting parts of friction clutches in automobile assembling plants.

An additional object of the invention is to provide a clutch whose parts are assembled in such a way that they occupy a relatively small amount of space in storage as well as in assembling plants.

A further object of the invention is to provide novel and improved means for centering clutch plates with reference to other parts of friction clutches.

Still another object of the invention is to provide a friction clutch which is constructed in such a way that a mechanical or an assembly plant worker is less likely to accidentally assemble one or more parts which are furnished by a first maker with one or more parts which are furnished by a second maker.

A further object of the invention is to provide a friction clutch wherein the cover, the diaphragm spring, the friction linings, the flywheels, the clutch plate and/or the pressure plate can perform functions other than as well as those in standard friction clutches to thus contribute to simplicity and convenience of storage, transport and installation.

Another object of the invention is to provide a power train which embodies the improved friction clutch.

An additional object of the invention is to provide the friction clutch with novel and improved means for facilitating installation of the entire clutch as a prefabricated module.

The invention is embodied in a friction clutch, particularly for attachment to a flywheel in a motor vehicle so that the clutch can transmit torque between the engine and the variable-speed transmission of the vehicle. The improved clutch comprises a rotary first unit including a cover or housing, a pressure plate having a first side facing toward the cover and a second side adjacent the flywheel when the clutch is attached to the flywheel, resilient means (e.g., a diaphragm spring) reacting against the cover and serving to bias the pressure plate, and means (e.g., a set of leaf springs and rivets for the ends of leaf springs) for non-rotatably but axially movably securing the pressure plate to the cover. The clutch further comprises a rotary second unit including a clutch plate which is adjacent the second side of the pressure plate, and the clutch also comprises novel and improved means for separably coupling the units to each other, at least prior to attachment of the clutch to the flywheel, so that the axes of rotation of the first and second units coincide or are closely adjacent one another.

The coupling means can comprise separable complementary first and second detent means which are respectively provided on the first and second units.

Alternatively, or in addition to such detent means, the coupling means can comprise means for terminating the connection between the first and second units in response to attachment of the clutch to the flywheel, for example, by automatically terminating the engagement between the first and second detent means as the first unit is being attached to the flywheel. The coupling means can include means for terminating the connection between the first and second units in response to at least one of a plurality of circumstances which develop subsequent to or during attachment of the clutch to the flywheel, e.g., the application of torque to the first unit through the medium of the flywheel or to the second unit through the medium of the transmission, temperature changes such as suffice to destroy an adhesive bond or the like, axial stressing of the second unit in response to engagement of the clutch subsequent to attachment of the first unit to the flywheel and/or others. The coupling means can undergo partial or complete destruction in order to terminate the connection between the first and second units, e.g., in response to transmission of torque to the first and/or second unit and/or in response to heating of one or more portions of the coupling means to a preselected temperature.

The coupling means can comprise manually separable first and second portions which are respectively provided on the first and second units of the clutch.

In accordance with a presently preferred embodiment, the coupling means comprises means for biasing the clutch plate axially toward the pressure plate, e.g., so as to maintain the clutch plate in a position of axial abutment against the pressure plate. Such coupling means can form-lockingly connect the clutch plate to the pressure plate. A first portion of the coupling means can be affixed to a part of the first unit (particularly to the cover), and a second portion of the coupling means can be provided on the clutch plate to bear against the first portion under the action of the resilient means (preferably by way of the pressure plate, i.e., the pressure plate is acted upon by the resilient means to bear against the clutch plate and the clutch plate then urges the second portion of the coupling means against the first portion). The clutch plate comprises at least one friction lining and a support (e.g., a multi-segment support) for the friction lining or linings. The support can extend beyond the friction lining or linings in the radial direction of the clutch plate and can include the aforementioned second portion of the coupling means. The friction lining or linings undergo wear in actual use of the clutch as a result of repeated frictional engagement with the flywheel and/or with the pressure plate so that the thickness of the friction lining or linings in the axial direction of the friction clutch decreases. The first portion of the coupling means is preferably maintained in a predetermined axial position with reference to the cover so that it is kept out of contact with the second portion in response to attachment of the first unit to the flywheel and irrespective of the extent of wear upon the friction lining or linings.

The arrangement may be such that a first portion of the coupling means is provided on the marginal portion of the cover of the first unit and a second portion of the coupling means is provided in the clutch plate and cooperates with the first portion to hold the clutch plate against axial movement away from the pressure plate.

The coupling means can comprise or constitute a yoke which is carried by one of the units (e.g., by the cover of the first unit) and overlaps the other unit so as to thereby limit the extent of axial movability of the clutch plate and the cover away from one another.

A portion of the coupling means can be rigid (e.g., integral) with the cover of the first unit.

In accordance with a presently preferred embodiment of the invention, the coupling means comprises a bayonet mount. Such bayonet mount can comprise an annulus of slots provided on or in one of the units and an annulus of projections provided on the other unit. At least one of the units is turnable relative to the other unit between a first angular position in which the projections register with the slots (so that the bayonet mount permits separation of the first and second units from each other or attachment of the second unit to the first unit) and a second angular position in which the projections are out of register with the slots (i.e., in which the bayonet mount is operative to lock the second unit to the first unit). The projections can be provided on the clutch plate and the slots are then provided on the first unit; such first unit can further comprise an annulus of second projections which alternate with the slots, and the projections of the clutch plate are located behind the second projections (namely between the second projections and the pressure plate of the first unit) in the second angular position of the at least one unit. Alternatively, the slots can be provided on the clutch plate and the clutch plate then comprises an annulus of second projections which alternate with the slots and engage the projections of the first unit in the second angular position of the at least one unit. The resilient means is arranged to store energy in the axial direction of the first and second units and to thereby bias the pressure plate toward the clutch plate so as to urge the projections of the one unit against the second projections in the second angular position of the at least one unit. This ensures that the bayonet mount is not loosened by accident prior to proper attachment of the first unit to the flywheel.

The coupling means can comprise a plurality of elastic first detent elements on the cover of the first unit and second detent elements provided on the clutch plate and cooperating with the first detent elements to releasably hold the clutch plate adjacent the pressure plate. The second detent elements stress the first detent elements radially outwardly during engagement with the first detent elements and the resilient means is preferably arranged to bias the pressure plate against or toward the clutch plate to thereby maintain the second detent elements in engagement with the first detent elements. The arrangement is preferably such that the second detent elements are automatically separated from the respective first detent elements in response to attachment of the first unit to the flywheel; at such time, the flywheel moves the first detent elements radially outwardly and away from engagement with the corresponding second detent elements. For example, the first detent elements can constitute elastic prongs or claws which tend to pivot radially inwardly and have inner sides provided with notches for reception of pallets, teeth or like portions of the second detent elements. When the prongs are bent outwardly in automatic response to attachment of the first unit to the flywheel, their notches move radially outwardly beyond the pallets or teeth of the adjacent second detent elements and the coupling means is thereby deactivated, i.e., the second unit is then held between the flywheel and the first unit (which is affixed to the flywheel).

It is also within the purview of the invention to employ coupling means which comprises at least one coupling element provided on the clutch plate and engaging with a complementary component on an axially movable part (particularly the pressure plate) of the first unit so as to hold the clutch plate against axial movement relative to the axially movable part and to simultaneously center the clutch plate relative to the first unit. Each coupling element is preferably located in the region of a friction surface of the pressure plate (this friction surface can engage a friction lining of the clutch plate), and the complementary component of such coupling means can further comprise retainer means provided on the pressure plate and engaging the coupling element or elements to limit (e.g., to zero) the extent of axial movability of the clutch plate relative to the pressure plate and/or vice versa. As mentioned above, the clutch plate comprises at least one friction lining and a support for the friction lining. The coupling element or elements are preferably disposed on or in the support radially outwardly of the friction lining or linings. The pressure plate is or can be provided with radially outwardly extending projections for the aforementioned securing means, and the retainer means can be provided on such projections. Each component of the coupling means can include a pin or the like which extends into the respective coupling element. Each such coupling element can include or constitute a hollow sleeve- or rivet-shaped body on the clutch plate so that its axial passage can receive the respective component. Each coupling element can be affixed to the support for the friction lining or linings of the second unit. The pressure plate can be provided with bores for the components of the coupling means. Alternatively, each component can be simply bonded to the friction surface of the pressure plate.

At least a portion of the coupling means can be made of a suitable plastic material.

The novel features which are considered as characteristic of the invention are set forth in particular in the appended claims. The improved friction clutch itself, however, both as to its construction and the mode of manipulating the same, together with additional features and advantages thereof, will be best understood upon perusal of the following detailed description of certain specific embodiments with reference to the accompanying drawing.

Figure 7:
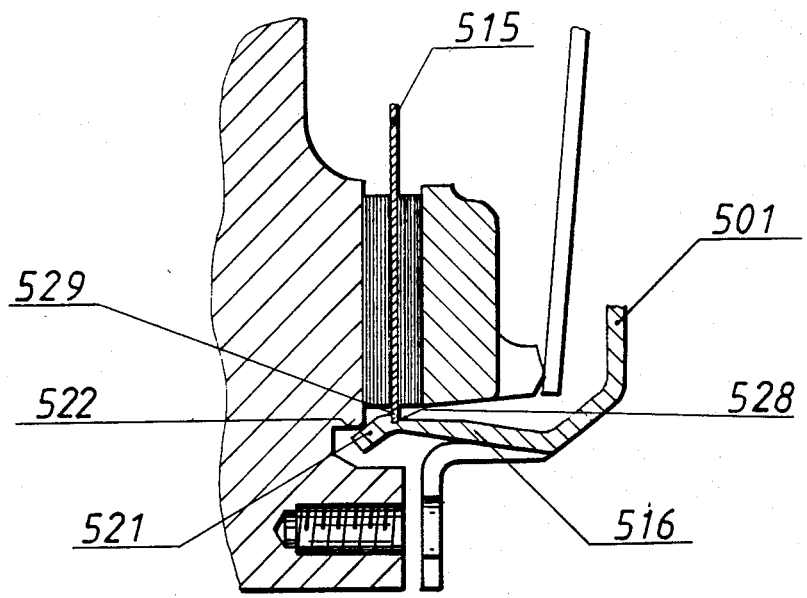
Figure 8:
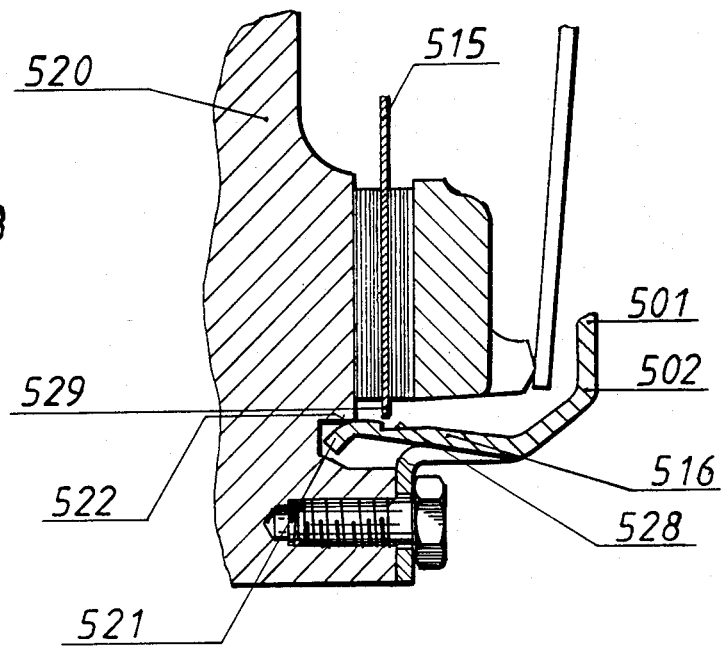

FIG. 7 is a fragmentary axial sectional view of a further friction clutch with coupling means wherein the housing or cover of the first unit has integral prong-like female coupling elements engaged by male coupling elements of the clutch plate; and FIG. 8 shows the structure of FIG. 7 but with the female coupling elements detached from the male coupling elements in response to attachment of the first unit to the flywheel.

DESCRIPTION OF THE PREFERRED EMBODIMENTS

Figure 1:
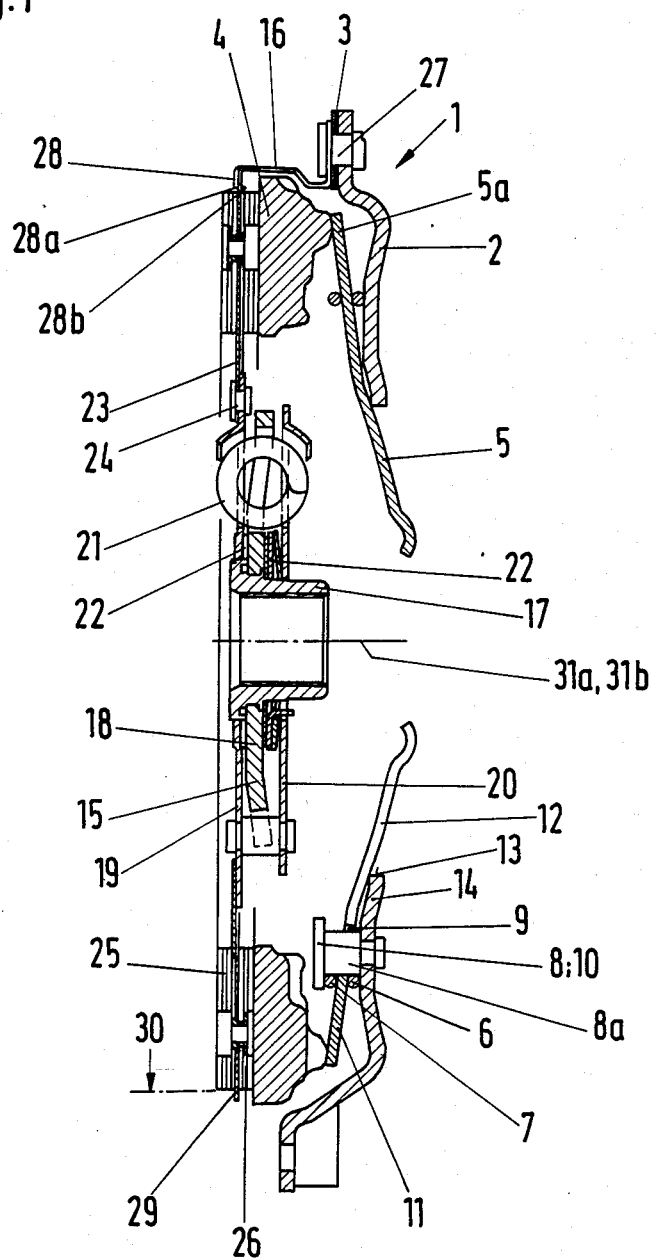
FIG. 1 is an axial sectional view of a friction clutch wherein the means for coupling the first and second units of the clutch to each other is constructed in accordance with a first embodiment of the invention, the two units jointly forming a preassembled package or kit which is ready to be affixed to a flywheel.

Referring first to FIG. 1, there is shown a friction clutch 1 which can be installed between a flywheel 32 (FIG. 2) on the output shaft of a motor vehicle engine and the input shaft of the variable-speed transmission in the vehicle. Reference may be had, for example, to commonly owned U.S. Pat. No. 4,611,701 granted Sept. 16, 1986 to Oswald Friedmann for "Torsion damping assembly for use in motor vehicles".

The friction clutch 1 comprises a first rotary unit including a cover or housing 2, a pressure plate 4 which is non-rotatably but axially movably secured to the cover 2 by leaf springs 3 and rivets 27 (FIGS. 1 and 2 merely show one of those rivets which connect the leaf springs 3 to the cover 2 but a rivet which connects one such leaf spring to the pressure plate can be seen in FIG. 4, as at 208), a resilient element in the form of a diaphragm spring 5 which is installed between the cover 2 and the pressure plate 4, two annular wire-like seats 6, 7 for the diaphragm spring 5, and a set of rivets 8 which are used to properly locate the diaphragm spring 5 relative to the seats 6, 7 and cover 2. The radially outermost portion 5a of the diaphragm spring 5 is designed to bear against the pressure plate 4 so that the latter is urged axially in a direction away from the cover 2 when the friction clutch 1 is engaged. The shanks 8a of the rivets 8 extend through suitable openings 9 in the washer-like main section 11 of the diaphragm spring 5 and each rivet 8 has a head 10 which overlies the seat 7 so that the latter is clamped between the head 10 and the respective side of the diaphragm spring 5 whereby the seat 6 is confined to the space between the diaphragm spring and the cover 2. The right-hand end portion of each rivet 8 is anchored in the cover 2. The main section 11 of the diaphragm spring 5 is integral with radially inwardly extending prongs 12 which can be moved axially by a suitable release bearing of any known design to disengage or release the friction clutch in a manner well known from the art of friction clutches for motor vehicles.

The cover 2 has a central aperture 13 bounded by an annular inner marginal portion 14 which serves as an abutment for the prongs 12 when the diaphragm spring 5 is caused to assume the position of FIG. 1, namely when the cover 2 of the first unit of the friction clutch 1 is not attached to the flywheel 32. In such position, the conicity of the diaphragm spring 5 is permitted to approach a maximum value. The arrangement is preferably such that the diaphragm spring 5 stores a certain amount of energy when in the position of FIG. 1, i.e., when the prongs 12 abut the marginal portion 14 of the cover 2. The prongs 12 then cooperate with the marginal portion 14 to ensure that the radially outermost portion 5a of the diaphragm spring maintains the pressure plate 4 in or close to a predetermined axial position with reference to the cover 2.

The second unit of the friction clutch 1 comprises a clutch plate 15 whose axis 31b coincides with or is closely adjacent the common axis 31a of the cover 2, diaphragm spring 5 and pressure plate 4, even when the two units of the clutch 1 are not secured to the flywheel 32. This is due to the provision of a novel and improved coupling device 16 which serves to hold the clutch plate 15 in a predetermined axial position relative to the pressure plate 4 and to simultaneously center the clutch plate relative to the cover 2, diaphragm spring 5 and pressure plate 4 in the aforedescribed manner, i.e., so that the axis 31b of the clutch plate 15 coincides with or is closely adjacent the axis 31a.

The illustrated clutch plate 15 comprises an internally splined hub 17 which can be slipped onto the input shaft of the variable-speed transmission of the motor vehicle, a radially outwardly extending flange 18 which is or can be integral with the hub 17, a first disc 19 which constitutes a support for friction linings 25, 26, a second disc 20 which is spaced apart from but is compelled to share all angular movements of the disc 19, and a set of energy storing elements in the form of coil springs 21 which are installed in registering windows of the discs 19, 20 on the one hand and flange 18 on the other hand. The discs 19, 20 can turn relative to the flange 18 and vice versa within limits which are imposed by the dimensions of the aforementioned windows and by the coil springs 21. This ensures that the friction linings 25, 26 on the disc or support 19 can turn relative to the flange 18 and hub 17 (or vice versa) when the friction clutch 1 is in use and the diaphragm spring 5 urges the pressure plate 4 against the right-hand friction lining 26 whereby the left-hand friction lining 25 is biased against the flywheel 32 and the latter can drive the transmission by way of the clutch plate 15 because the clutch plate is then clamped between the pressure plate 4 and the flywheel 32. The reference character 22 denotes one or more friction generating devices which are installed in the clutch plate 15 to damp angular movements of the discs 19, 20 and friction linings 25, 26 relative to the flange 18 and hub 17. The disc or support 19 preferably comprises a washer-like inner portion which is provided with windows for the coil springs 21, and segment-shaped outer portions (segments) 23 which are riveted (at 24) or otherwise secured to the washer-like inner portion and carry the friction linings 25, 26. The segments 23 are capable of undergoing elastic deformation in the axial direction of the clutch plate 15.

The coupling device 16 preferably comprises several identical parts which are equally spaced apart from one another in the circumferential direction of the cover 2 and plates 4, 15. Each such part comprises a first detent member 28 affixed to the marginal portion of the cover 2 by one of the rivets 27 and a second detent member 29 which constitutes a radially outwardly projecting portion of the support or disc 19, namely of one of the segments 23 for the friction linings 25, 26. By way of example, the coupling device 16 need not comprise more than two but it can comprise three or more equidistant parts each including a first detent member 28 and a second detent member 29. It is presently preferred to employ a coupling device which has at least three identical or substantially identical parts. It is clear that the detent members 28 can be secured to the cover 2 by discrete fasteners, i.e., not necessarily by the rivets 27 for the leaf springs 3; however, the illustrated construction is preferred at this time because it renders it possible to reduce the number of separate parts. Moreover, each detent member 28 can constitute a suitably bent integral lug of the cover 2 or an integral portion of one of the leaf springs 3. Each detent member 28 is substantially Z-shaped and includes a radially outwardly extending leg which is secured to the cover 2 by one of the rivets 27, a radially inwardly extending leg 28a which overlies the respective detent member 29 of the support or disc 19, and an intermediate portion or web which extends substantially axially of the clutch 1 and is integral with the neighboring end portions of the legs. The reference character 30 denotes the outer diameter of the friction lining 25; the detent members 29 extend radially outwardly beyond such lining and are disposed between the respective side of the pressure plate 4 and the corresponding detent members 28. Each leg 28a has an axially extending portion or lug 28b which is outwardly adjacent the respective detent member 29 so that the lugs 28b cooperate with the detent members 29 to center the detent members 29 and hence the entire clutch plate 15 relative to the cover 2, pressure plate 4 and diaphragm spring 5 of the first unit of the clutch 1, i.e., to ensure that the axis 31b of the clutch plate 15 coincides with or is very close to the axis 31a of the first unit. The axes 31a, 31b are held in such positions relative to each other before the cover 2 is secured to the flywheel 32, i.e., while the clutch 1 including the two units is in storage or in transport. This simplifies the manipulation of clutch 1 and especially the task of a manipulator which is used to move the clutch 1 to proper position relative to as well as to connect the thus positioned clutch with the flywheel 32.

The dimensions of the detent members 28 are selected in such a way that, when the radially inwardly extending arms 28a of these detent members are in contact with the outer sides of the respective detent members 29, the friction lining 26 is in contact with the adjacent friction surface of the pressure plate 4. The latter is biased against the friction lining 26 by a diaphragm spring 5 while the prongs 12 of this spring abut the inner marginal portion 14 of the cover 2. The material of the detent members 28 is or can be at least slightly elastic so that such detent members can yield when the clutch plate 15 is coupled to the first unit of the clutch 1 in a manner as shown in FIG. 1, i.e., when the prongs 12 abut the marginal portion 14, the pressure plate 4 abuts the friction lining 25 and the detent members 29 of the disc or support 19 abut the radially inwardly extending arms 28a of the respective detent members 28.

Figure 2:
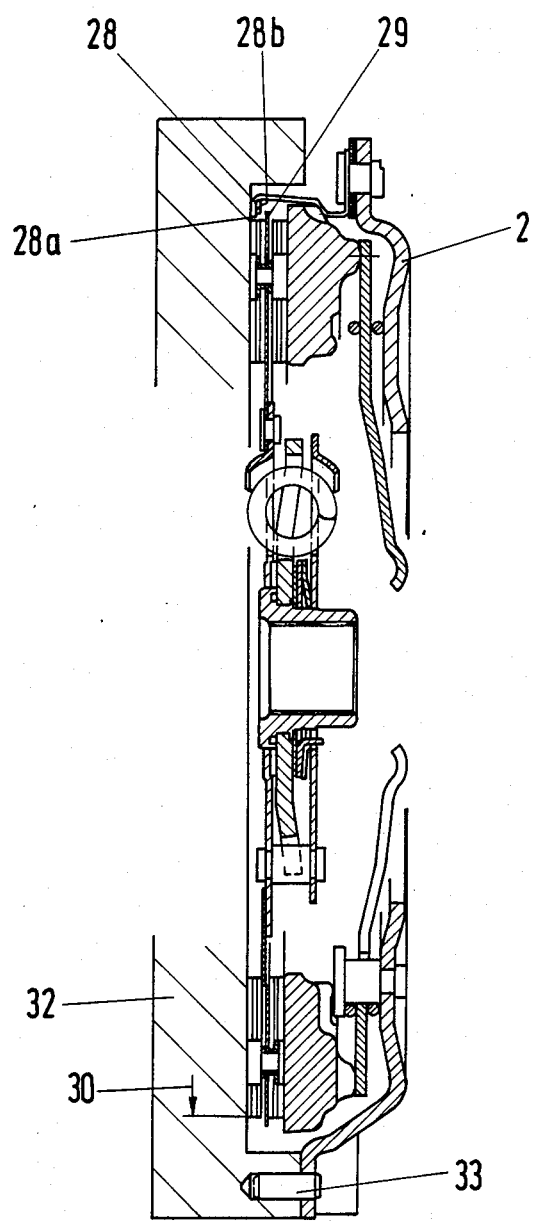
FIG. 2 shows the friction clutch of FIG. 1 and the flywheel which carries the first unit of the clutch, the first and second portions of the coupling means being separated from one another so that the pressure plate of the first unit and the clutch plate of the second unit can move axially relative to each other.

FIG. 2 shows the first unit of the clutch 1 in proper position with reference to the flywheel 32, i.e., the cover 2 is secured to the flywheel by a set of screws, bolts or similar fasteners (not shown). This results in certain axial displacement of the cover 2 and pressure plate 4 (and clutch plate 15) relative to each other so that the radially inwardly extending legs 28a of the detent members 28 are axially spaced apart from the respective detent members 29. The extent to which the plates 4, 15 are shifted axially relative to the cover 2 when the latter is properly affixed to the flywheel 32 is such that the legs 28a remain out of contact with the detent members 29 even if the friction linings 25, 26 (especially the friction lining 25 between the disc 19 and the adjacent friction surface of the flywheel 32) undergo extensive wear. The first unit of the clutch 1 can be properly centered relative to the flywheel 32 by the aforementioned fasteners which secure the cover to the flywheel as well as by several positioning or centering elements in the form of pins 33 (only one shown in FIG. 2) each of which extends into registering holes of the cover 2 and friction wheel 32. These centering pins can be anchored in the flywheel 32. The diaphragm spring 5 is caused to store additional energy when the cover 2 is properly secured to the flywheel 32 so that its radially outermost portion 5a exerts upon the pressure plate 4 a pronounced force which ensures that the friction linings 25, 26 of the clutch plate 15 are reliably clamped between the friction surfaces of the flywheel and the pressure plate when the clutch 1 is engaged. In order to disengage the clutch, the aforementioned release bearing is caused to move axially toward the flywheel 32 so as to depress the radially innermost portions of the prongs 12 and to enable the leaf springs 3 to pull the pressure plate 4 away from the clutch plate 15 so that the flywheel 32 can rotate relative to the clutch plate and relative to the input shaft of the variable-speed transmission which is connected to the hub 17.

The radially inwardly extending legs 28a of the detent members 28 can be said to constitute an annulus of projections provided on the cover 2 and alternating with slots which permit passage of detent members 29 in any one of several predetermined angular positions of the clutch plate 15 and cover 2 relative to each other. Thus, the clutch plate 15 can be moved between a first angular position in which each of the detent members 29 registers with a slot between two neighboring projections or legs 28a so that the clutch plate 15 and the unit including the cover 2 can be moved axially toward or away from each other, and a second angular position in which each of the legs 28a is located between the pressure plate 4 and the respective detent member 29. The detent members 29 can be said to constitute a second annulus of projections which are provided on the clutch plate 15 (actually on the disc 19 and more particularly on the segments 23 of the disc 19) and cooperate with the projections or legs 28a to constitute the aforementioned rudimentary bayonet mount. The width of spaces between the annuli of detent members 29 can exceed the width of such detent members (as considered in the circumferential direction of the clutch plate 15), and the width of spaces between the legs or projections 28a can exceed the width of these projections. Axial movement of the clutch plate 15 with reference to the cover 2 to the position which is shown in FIG. 1 entails a certain stressing of the diaphragm spring 5 so that, when the clutch plate 15 is moved from the aforementioned first to the aforementioned second angular position, the detent members 29 bear against the adjacent radially inwardly extending projections or legs 28a to thereby ensure that the clutch plate 15 cannot be accidentally rotated back to its first angular position in which the bayonet mount of the detent device 16 would become disengaged and the clutch plate 15 would be free to move axially of and away from the pressure plate 4 beyond the position which is shown in FIG. 1.

If the detent members 29 are not or cannot be provided on the segments 23, such detent members (alternating with slots) can be formed by the radially outermost portions of the friction linings 25, 26 so that such radially outermost portions of the friction linings cooperate with the detent members 28 to jointly form a bayonet mount.

An important advantage of the coupling device 16 is that it ensures the retention of the first and second units of the clutch 1 in optimum positions for packing, storage, transport and installation in the power train of a motor vehicle or the like. Thus, the clutch plate 15 is properly centered during storage or transport to the assembly plant and is maintained at an optimum axial distance from the cover 2 prior to as well as during installation in a motor vehicle. The clutch plate 15 is automatically released for axial movement relative to the pressure plate 4 and/or vice versa, either during installation or as soon as the mounting of the clutch 1 in the power train of a vehicle is completed. Moreover, the coupling device 16 is simple, compact and inexpensive and its cost is more than compensated for by the advantages as concerns the possibility of jointly packing both units of the clutch, jointly storing such units, jointly transporting the units to the plant as well as in the plant, and jointly installing the units in the power train in optimum axial and radial positions relative to each other and relative to the carrier, such as the flywheel 32. Thus, when the two units are transported to the production line in an automobile assembling plant, they can be transported on a common pallet rather than on two separate pallets as heretofore, and the installation of clutch 1 between the flywheel 32 and the input shaft of a variable-speed transmission is much simpler than separate installation of the two units in a manner which is customary in accordance with the presently prevailing practice. One can dispense with conventional centering mandrels which are used in connection with the mounting of friction clutches without coupling devices; this also contributes to lower cost of and to more rapid mounting of the friction clutch on the flywheel or the like. Moreover, the centering of clutch plate 15 relative to the first unit of the clutch 1 and the pilot bearing is sufficiently accurate to ensure that the input shaft of the variable-speed transmission can be readily introduced into the hub 17 without resorting to the aforementioned centering mandrel. Improper centering of clutch parts which are packed and transported in accordance with heretofore known techniques often necessitates a secondary treatment, namely dismantling of the clutch and renewed advancement of the transmission to a position in which the input shaft of the transmission can enter the clutch plate. Such secondary treatment creates a bottleneck which greatly affects the operation of the entire production line. All this can be avoided by the provision of an extremely simple, compact and inexpensive coupling device which is called upon to properly center the clutch plate 15 relative to the unit including the cover 2 as well as to preferably maintain the clutch plate at an optimum axial distance from the cover and/or pressure plate.

Figure 3:
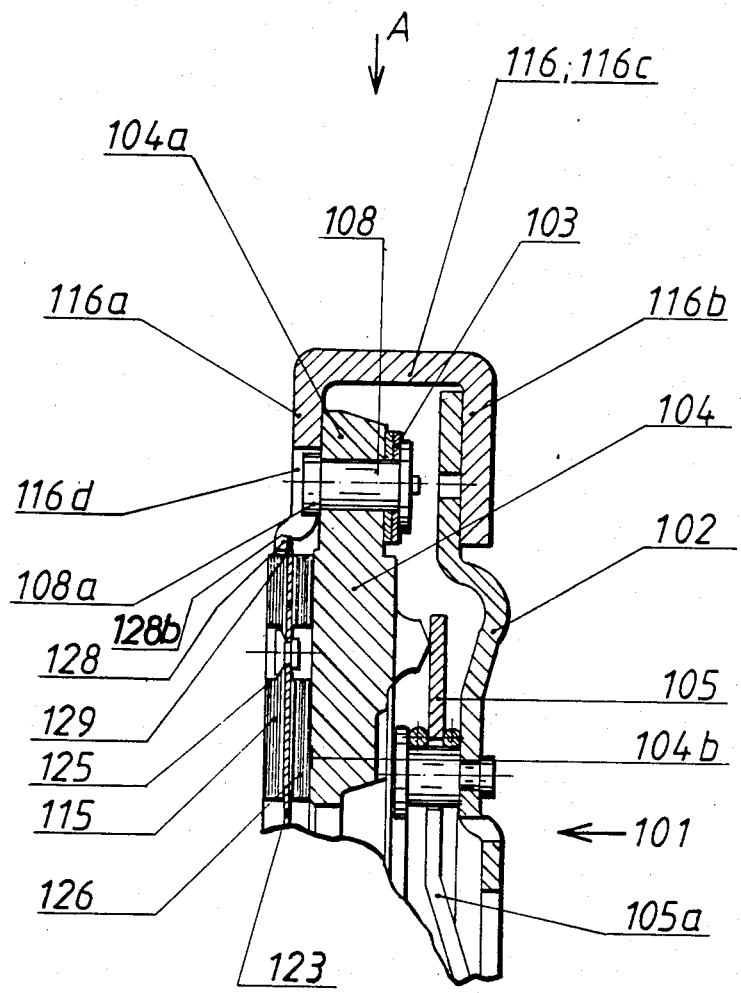
FIG. 3 is an enlarged fragmentary axial sectional view of a modified friction clutch wherein the first and second units are separably connected to each other by yoke-like coupling means.

FIG. 3 shows a portion of a friction clutch 101 wherein all such parts which are identical with or clearly analogous to corresponding parts of the friction clutch 1 of FIGS. 1-2 are denoted by similar reference characters plus 100. The only difference is that the illustrated prong of the diaphragm spring 105 forming part of the first unit (which further includes the cover 102, the leaf springs 103 and the pressure plate 104) is denoted by the reference character 105a. The manner in which the cover 102 is connectable with and can be centered relative to a flywheel (not shown in FIG. 3) is or can be the same as described in connection with FIG. 2. The conicity of the diaphragm spring 105 matches or is close to that when the cover 102 is properly secured to the flywheel and the friction linings 125, 126 of the clutch plate 115 are new, i.e., they have undergone a minimum of wear or no wear at all. The radially outermost portion of the diaphragm spring 105 bears against the projections (not referenced) of the pressure plate 104 with a pronounced force which ensures that the friction linings 125, 126 are properly clamped between the friction surfaces of the flywheel and pressure plate 104, i.e., that the clutch plate 115 can rotate the input shaft of the variable-speed transmission in response to rotation of the flywheel which is assumed to be attached to the crankshaft of the internal combustion engine.

The coupling device 116 for the two units of the clutch 101 comprises two, three or more substantially yoke-like or U-shaped parts of which only one can be seen in FIG. 3. Each such yoke-like part includes a first radially inwardly extending portion or leg 116a which overlies the adjacent side of the pressure plate 104 radially outwardly of the friction linings 125, 126, a second radially inwardly extending portion or leg 116b which overlies the exposed side of the cover 102, and a substantially axially extending median portion or web 116c which is integral with the radially outermost portions of the legs 116a, 116b. The distance between the confronting sides of the legs 116a, 116b is selected in such a way that the diaphragm spring 105 of the first unit of the clutch 101 stores a certain amount of energy and biases the pressure plate 104 toward the leg 116a as well as toward the friction lining 126 of the clutch plate 115. This ensures that the prongs 105a of the diaphragm spring 105 do not or need not project well beyond the outer side of the cover 102 so that the two units of the friction clutch 101 occupy a relatively small amount of space in storage or during shipment to or transport in an automobile making plant. Such compactness of the clutch 101 (while its units are held together by the parts of the coupling device 116) is also desirable and advantageous during installation of the two units between a flywheel and a variable-speed transmission.

The holding device 116 further serves to center the clutch plate 115 relative to the cover 102, diaphragm spring 105 and pressure plate 104 of the first unit of the clutch 101. As shown, each arm 116a of the coupling device 116 has a radially inwardly extending detent member 128 which is closely adjacent the peripheral surface of the friction lining 125 so that the latter is held in a predetermined position relative to the pressure plate 104, namely in such a way that the axis of the clutch plate 115 coincides with or is closely adjacent the axis of the pressure plate 104. The detent members 128 ensure that the two units of the clutch 101 need not be centered relative to each other prior to attachment of the cover 102 to the flywheel. The detent members 128 overlie cooperating detent members 129 which are provided on the segments 123 of the disc-shaped support for the friction linings 125, 126.

Each leg 116a can be bifurcated so that its tongues or prongs flank the head 108a of the adjacent rivet 108 which is used to secure one end portion of one of the leaf springs 103 to a radially outwardly extending projection 104a of the pressure plate 104. The other end portion of each leaf spring 103 is connected to the cover 102 so as to ensure that the cover 102 and the pressure plate 104 can move axially but cannot turn relative to each other. The reference character 116d denotes the slot between the two prongs of the illustrated bifurcated leg 116a.

Each detent member 128 is axially offset relative to the major portion of the respective leg 116a and is integrally connected to such major portion by an axially extending connecting or centering portion 128b which is adjacent the radially outermost portion of the respective detent member 129. Thus, the portions 128b cooperate with the detent members 129 to center the clutch plate 115 relative to the pressure plate 104; such centering action is performed in addition to or in lieu of the centering action of detent members 128 upon the friction lining 125. As mentioned above, the centering action of the legs 116a and their portions 128, 128b upon the friction lining 125 and/or segments 123 of the disc-shaped support for the friction linings 125, 126 is preferably such that the axis of the clutch plate 115 coincides with or is at least very closely adjacent the common axis of the cover 102, diaphragm spring 105 and pressure plate 104. The detent members 128 of the legs 116a extend radially inwardly beyond the respective centering portions 128b.

When the coupling device 116 is properly applied, the detent members 129 preferably abut the respective detent members 128 under the action of the stressed diaphragm spring 105 so that the friction surface 104b of the pressure plate 104 bears against the friction lining 126. The magnitude of friction between the surface 104b and the friction lining 126 suffices to ensure that the clutch plate 115 remains centered on the unit including the cover 102. Such friction renders it possible to dispense with the centering portions 128b (i.e., to dispense with centering of the clutch plate 115 by way of the detent members 129) and to center the clutch plate solely by means of detent members 128 and friction lining 125. Alternatively, adequate friction between the surface 104b and the lining 126 renders it possible to dispense with the centering action of the detent members 128 in cooperation with the friction lining 125 and to center the clutch plate 115 solely by means of the portions 128b and detent members 129. Still further, one can dispense with the centering action of the detent members 128 and 129 if the two units of the clutch 101 are assembled as follows:

The two units are placed into a suitable truing, centering or assembling device (not shown) so that the clutch plate 115 is coaxial with the pressure plate 104. The clutch plate 115 is then moved axially toward the pressure plate 104 (or the radially innermost portions of the prongs 105a of the diaphragm spring 105 are depressed, the same as for disengagement of the clutch 101) so that the plates 104, 115 move as a unit toward the inner side of the cover 102 in order to ensure that the distance between the outer sides of the pressure plate 104 and cover 102 will be less than the distance between the legs 116a, 116b of the parts of the coupling device 116. Thus, the yoke-like parts of the coupling device 116 can be slipped onto the cover 102 and pressure plate 104 to assume operative positions corresponding to that of the part which is shown in FIG. 3. Thus, each leg 116b then overlies the outer side of the cover 102 and each detent member 128 is located outwardly of the respective detent member 129. The pressure upon the clutch plate 115 in a direction toward the cover 102 is thereupon relaxed so that the diaphragm spring 105 can dissipate energy and biases the cover 102 against the legs 116b while simultaneously biasing the pressure plate 104 toward the inner sides of the legs 116a. The detent members 128 are then engaged by the adjacent detent members 129. The thus coupled-together units of the clutch 101 are then removed from the aforementioned centering or assembling device and can be placed in storage or sent to a packing station.

The dimensions of each part of the coupling device 116 can be selected in such a way that the diaphragm spring 105 does not or need not store additional energy in response to attachment of the cover 102 to a flywheel. However, it is then necessary to depress the inner end portions of the prongs 105a of the diaphragm spring 105 (in the same way as during disengagement of the clutch 101) in order to reduce the pressure between the legs 116a, 116b on the one hand and the pressure plate 104 and cover 102 on the other hand, i.e., to allow for detachment of parts of the coupling device 116 from the properly mounted friction clutch 101.

Alternatively, the parts of the coupling device 116 can be dimensioned and designed in such a way that the last stage of attachment of the cover 102 to a flywheel (by means of a set of screws or bolts) entails some slight axial shifting of the pressure plate 104 toward the cover 102 and/or vice versa against the opposition of the diaphragm spring 105 (e.g., through a distance of 0.3 to 1 mm) so that the distance between the marginal portions of the pressure plate and cover is reduced and the parts of the coupling device 116 can be readily slipped off the pressure plate and cover with no effort at all or with a minimum of effort.

If the parts of the coupling device 116 are provided with arms 116a which carry detent members 128 and/or centering portions 128b to ensure that the clutch plate 115 will be adequately centered relative to the unit including the pressure plate 104, the axial positions of detent members 128 relative to the friction surface 104b of the pressure plate 104 (in properly applied positions of yoke-like parts of the coupling device 116) can be selected in such a way that the detent members 128 are at least slightly spaced apart from the adjacent detent members 129 as well as that a certain preferably small clearance or gap exists between the friction surface 104b and the friction lining 126 of the clutch plate 115. Such mutual spacing of 128 and 104b as well as 104b and 126 can be selected regardless of whether the detachment of yoke-like parts of the coupling device 116 necessitates a depression of the innermost portions of prongs 105a or whether the parts of the coupling device 116 can be slipped off or can descend by gravity as soon as the cover 102 is adequately affixed to the flywheel.

The parts of the coupling device 116 can be centered on the unit including the pressure plate 104, e.g., by ensuring that the webs 116c of all parts abut against the periphery of the cover 102 and/or against the periphery of the pressure plate 104. As mentioned above, the parts of the coupling device 116 can further center the clutch plate 115 relative to the pressure plate 104 so that no additional centering is necessary preparatory to attachment of the cover 102 to a flywheel.

In order to simplify the making and hence the cost of the parts of the coupling device 116, each yoke-like part can have a constant or nearly constant width in the circumferential direction of the clutch 101. The parts of the coupling device 116 can be made of a metallic or plastic material. The same holds true for all other embodiments of the coupling device. These parts can be mass-produced in available sheet metal or plastic forming machines.

It is presently preferred to center the clutch plate 115 by means of the portions 116b and detent members 129 of the segments which support the friction linings 125, 126.

Figure 4:
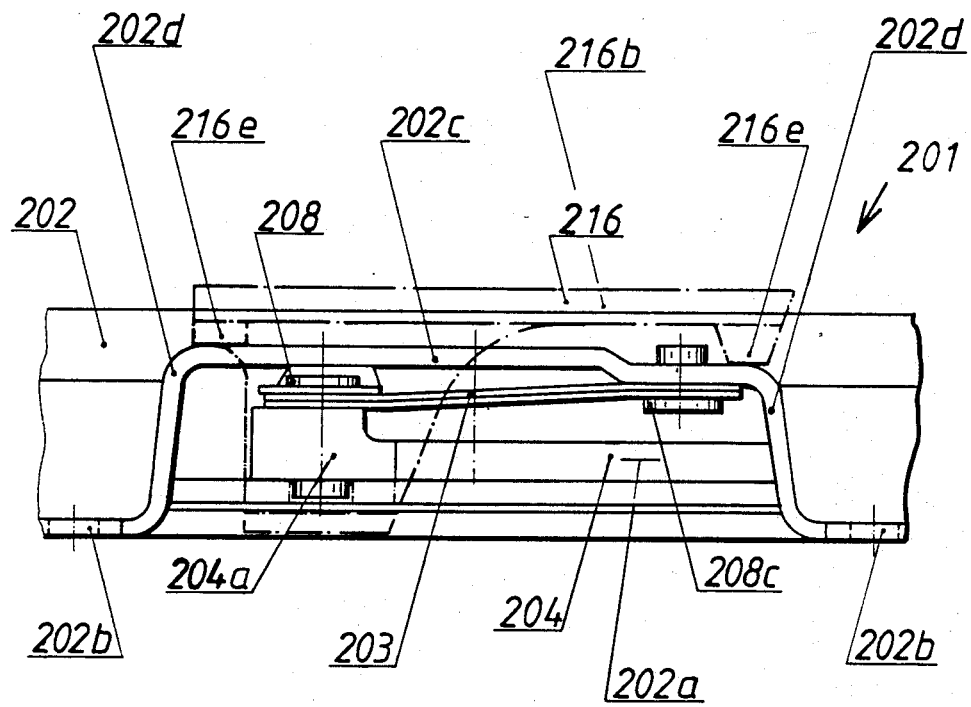
FIG. 4 is a fragmentary end elevational view, substantially as seen in the direction of arrow A in FIG. 3, showing a portion of a friction clutch with a third embodiment of means for coupling the first and second units of the clutch to each other.

FIG. 4 shows a portion of a friction clutch 201 wherein the two units can be held together by a modified coupling device 216 one part of which is indicated by phantom lines. The view of FIG. 4 is taken substantially as seen in the direction of arrow A in FIG. 3. Each part of the coupling device 216 again constitutes a substantially U-shaped (yoke-like) body which is slipped onto the cover 202 and a radially outwardly extending projection 204a of the pressure plate 204 of the first unit and has a detent member (not shown in FIG. 4 but corresponding to the detent member 128 of FIG. 3) which cooperates with a complementary detent member of the clutch plate (not shown in FIG. 4). The cover 202 is axially movable but non-rotatably connected with the pressure plate 204 by a set of leaf springs 203 each having a first end portion affixed to the respective projection 204a by a rivet 208 and a second end portion affixed to a radially outwardly and circumferentially extending portion 202c of the cover 202 by a rivet 208c. Each cover portion 202a constitutes the bottom wall for a relatively shallow (as seen in the axial direction of the clutch 201) but relatively long (as seen in the circumferential direction) recess 202a of the cover 202. The portion 202c is recessed with reference to the front marginal portion 202b of the cover 202 (the portion 202b is formed with holes for screws, bolts or analogous fasteners which secure the cover to a flywheel, not shown in FIG. 4). Each leaf spring 203 is mounted in a discrete recess 202a of the cover 202, and each leaf spring extends substantially tangentially of the pressure plate 204. The connection between the portion or bottom wall 202c and the front marginal portion 202b is established by two substantially axially extending portions 202d which are spaced apart from one another in the circumferential direction of the cover 202.

In order to prevent the parts of the coupling device 216 from bending or twisting the respective portions 202c of the cover 202, each such part is designed with a view to ensure that it abuts the portion 202c only in the regions of the respective ends of axially extending portions 202d, i.e., in regions where the cover 202 exhibits a maximum resistance to deformation because the portions 202d act not unlike reinforcing ribs and hold the respective regions of the cover 202 against deformation. The parts of the coupling device 216 are biased by the diaphragm spring (not shown in FIG. 4) so that they could deform the respective portions 202c if the entire bias of the diaphragm spring were transmitted to 202c. That leg (216b) of the illustrated part of the coupling device 216 which is adjacent the exposed side of the cover 202 (i.e., at a level above the cover as seen in FIG. 4) is provided with two spaced-part protuberances 216e which abut the portion 202c in the regions of or close to the axially extending portions 202d but the illustrated part of coupling device 216 is otherwise out of contact with the portion 202c. It will be noted that the length of each part of the coupling device 216 (in the circumferential direction of the cover 202) equals or approximates the length of a recess 202a so as to ensure that the protuberances 216e will bear against the cover 202 in the regions of the respective portions 202d. In all other respects, the parts of the coupling device 216 can be similar to or identical with the parts of the coupling device 116 of FIG. 3.

Figure 5:
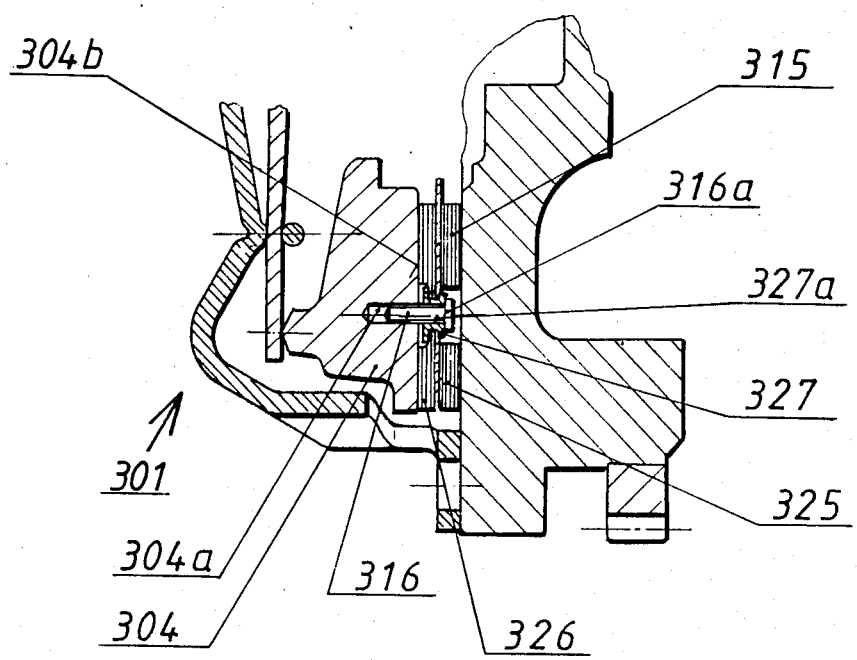
FIG. 5 is a fragmentary axial sectional view of a friction clutch with different means for separably coupling the first and second units of the clutch to each other, the coupling means comprising pin-shaped male components which are received in hollow rivet-shaped female coupling elements.

FIG. 5 shows a portion of a friction clutch 301 wherein the first unit comprises a cover, a diaphragm spring and a pressure plate 304 having several sockets in the form of blind bores 304a (only one shown) provided in the friction surface 304b. Each bore 304a receives a portion of a male component 316a of a modified coupling device 316 which further comprises hollow rivet-like or sleeve-like coupling elements 327 constituting a means for securing the friction lining 326 to the disc-shaped support of the clutch plate 315. The cover of the first unit of the friction clutch 301 is properly secured to a flywheel not referenced) by a set of screws or analogous fasteners one of which is indicated by a horizontal phantom line. The shank of the male component 316a of the coupling device 316 extends through the axial hole 327a of the coupling element 327 and into the blind bore 304a of the pressure plate 304 so that the friction lining 326 is held in contact with the friction surface 304b of the pressure plate. The main difference between the coupling device 316 of FIG. 5 and the coupling devices 16, 116, 216 of FIGS. 1-4 is that the coupling device 316 does not or need not have any elements which are directly secured to the cover of the first unit of the friction clutch 301. Each male component 316a can constitute a relatively weak dowel which can break in response to rotation of the clutch plate 315 relative to the unit including the pressure plate 304 and/or vice versa. The shanks of the male components 316a of the coupling device 316 are or can be anchored in the respective blind bores 304a of the pressure plate 304, and the heads of the male components 316a abut the right-hand end faces of the respective hollow coupling elements 327. If desired, the shanks of the male components 316a can be provided with elastic radially outwardly extending protuberances (not shown) or each such male component can have two or more prongs which tend to move radially and away from each other so that they bear against the surface surrounding the respective blind bore 304a when the components 316a are properly anchored in the pressure plate 304.

It is presently preferred to make each male component 316a of a plastic material which exhibits a relatively low resistance to shearing, breaking and like stresses, or of a metallic material (such as aluminum) which has similar properties. The diameters of the shanks of male components 316a are selected in such a way that the shanks break in response to the application of relatively small torsional stresses, i.e., in response to turning of the clutch plate 315 relatively to the pressure plate 304 and/or vice versa. It is often preferred to make the components 316a of a relatively brittle material to further promote destruction at the desired locations when the coupling action of the device 316 is to be terminated because the cover of the friction clutch 301 is properly secured to the flywheel.

It is further within the purview of the invention to omit the bores 304a in the friction surface 304b of the pressure plate 304 and to simply bond one end portion of each male component 316a of the coupling device 316 to the friction surface 304b. The bonding can be effected by welding or by resorting to a suitable adhesive. For example, the male components 316a can be made of a suitable thermoplastic material which softens in response to heating (particularly on contact with the preheated pressure plate 304) so that each thermoplastic male component adheres to the pressure plate with a force which suffices to couple the two units of the friction clutch 301 to each other prior to and during attachment of the cover of the friction clutch to the flywheel. It often suffices to merely heat selected portions of the pressure plate 304 to a temperature which ensures adequate softening of the thermoplastic material of the male components 316a and to thereupon allow the pressure plate to cool or to intentionally cool the pressure plate so as to establish with the male components a bond which is necessary to maintain the two units of the friction clutch 301 in optimum positions relative to each other, not only as concerns the distance of the pressure plate 304 and clutch plate 315 from each other and from the flywheel but also as regards the positions of the axes of rotation of the two units relative to one another.

Instead of heating the pressure plate 304, it is equally possible to bond thermoplastic male components 316a to the pressure plate by ultrasonic welding.

The coupling device 316 can be modified in a number of additional ways. For example, the entire coupling device 316 can consist solely of means for bonding the friction lining 326 to the friction surface 304b of the pressure plate 304. All that is necessary is to spot bond relatively small portions of the friction lining 326 to the adjacent portions of the friction surface 304b. For example, at least one annulus of spaced-apart portions of the friction surface 304b can be bonded to adjacent portions of the friction lining 326 with a force which cannot resist any pronounced torsional stresses so that the bond between the pressure plate 304 and the friction lining 326 of the clutch plate 315 is destroyed in response to even minor angular displacement of the two units of the friction clutch 301 relative to each other. Alternatively, one can employ a thin foil which is adhesive at both sides and is placed between the friction lining 326 and the pressure plate 304.

The head of the illustrated male component 316a of the coupling device 316 is accessible by way of an opening in the friction lining 325 of the clutch plate 315.

The coupling between the clutch plate 315 and the elements of the first unit of the clutch 301 can be interrupted in response to application of requisite tensional stresses which entail extraction of male components 316a from the holes 327a of the respective female components, e.g., so that the entire male components are then located within the confines of the clutch plate 315 and cannot interfere with axial movements of the clutch plate and pressure plate 304 relative to each other. Such tensional stresses can also suffice to disengage from the friction surface 304b of the pressure plate 304 male components which are merely bonded to the friction surface.

The male components 316a can be provided with weakened portions to facilitate destruction in response to rotation of the plates 304, 315 relative to each other or in response to the application to tensional stresses in the axial direction of the clutch. The same holds true for all or nearly all embodiments of the improved coupling device, i.e., at least one of its parts, elements or members can be weakened to ensure predictable breakage in response to the application of a predetermined torsional, tensional and/or other stress.

Still further, it is possible to design the coupling device 316 of FIG. 5 and/or at least certain other coupling devices in such a way that the connection between the detent members on the clutch plate and the associated detent members on the first unit of the clutch is terminated under the action of centrifugal force when the flywheel is set in rotary motion. Moreover, centrifugal force can be relied upon to expel certain broken-off portions of the coupling device from the interior of the clutch. The action of centrifugal force can be assisted by other parameters which develop when the clutch is put to use, e.g., heating, torque, tensional stresses and/or others. As described in connection with FIG. 3, manual separation of parts of the coupling device from the two units of the friction clutch is also contemplated when the time element permits such relatively slow manipulation of the coupling device subsequent to or during attachment of the two units of the friction clutch to a flywheel or to another carrier. All that is necessary in order to allow for manual detachment of the parts of the improved coupling device is to terminate or loosen the form- or force-locking connection between the cooperating detent members of each part or between such parts and the two units of the friction clutch. Thus, the force-locking connection between the parts of the coupling device 116 of FIG. 3 and the two units of the friction clutch 101 can be terminated in a very simple and reliable and effective way by the aforediscussed expedient of moving the pressure plate 104 toward the cover 102 and/or vice versa in response to attachment of the cover to the flywheel whereby the force-locking connection between the legs 116a, 116b and the adjacent elements of the first unit is terminated and the parts of the coupling device 116 can descend by gravity or can be readily slipped off the pressure plate 104 and cover 102 by hand.

Figure 6:
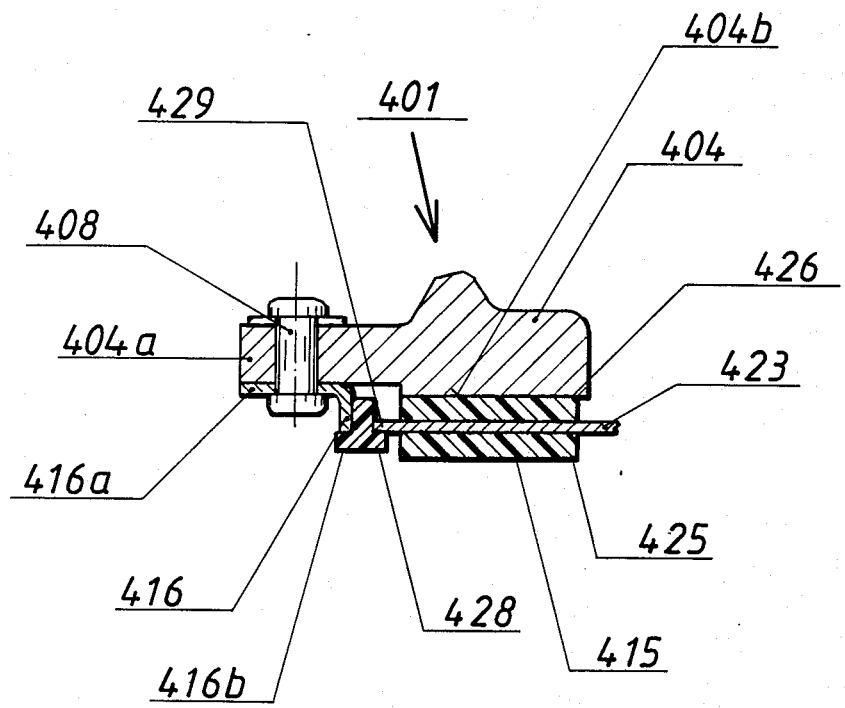
FIG. 6 is a fragmentary axial sectional view of a friction clutch with coupling means constituting a modification of the coupling means of FIG. 5.

Referring to FIG. 6, there is shown a portion of a friction clutch 401 and one part of a coupling device 416 which constitutes a further modification of the coupling device 316 of FIG. 5. The first unit of the clutch 401 comprises a pressure plate 404 which is adjacent the friction lining 426 of a clutch plate 415 constituting the second unit of the clutch 401. The coupling device 416 maintains the plates 404, 415 in predetermined axial positions relative to each other and also serves to center the clutch plate with reference to the unit which includes the pressure plate. The illustrated part of the coupling device 416 comprises a detent member or retainer 416a which is affixed to the radially outwardly extending projection 404a of the pressure plate 404 by a rivet 408 and has an axially extending inner portion rigid with a plastic centering portion 416b which abuts a detent member 429 forming an integral part of the respective segment 423 of the disc-shaped support for the friction linings 425, 426 of the clutch plate 415. The head 428 of the centering portion 416b abuts the outer side of the detent member 429 so that the clutch plate 415 is held in the illustrated axial position in which its friction lining 426 abuts the friction surface 404b of the pressure plate 404. At the same time, the shank of the centering portion 416b abuts the periphery of the detent member 429 and cooperates with the other centering portions 416b and detent members 429 to properly center the clutch plate 415 relative to the unit including the pressure plate 404. The centering portion 416b can be broken off the retainer 416a in response to the exertion of a relatively small force. Alternatively, the centering portion 416b can be made of a thermoplastic material which melts in response to heating when the clutch 401 is in use so that it releases the clutch plate 415 for axial movement relative to the pressure plate 404. By way of example, the centering portion 416b can be made of a thermoplastic material which is selected in such a way that the head 428 can readily break off the shank (to become separated from the retainer 416a) and/or that, if no breaking takes place, the entire centering portion 416b or a substantial part of the centering portion melts in response to heating as a result of application of the friction clutch 401.

Each retainer 416a can be an integral element of a different one of a set of leaf springs which are used to axially movably but non-rotatably connect the pressure plate to the cover of the clutch 401 and which are connected to the pressure plate 404 by the rivets 408. This simplifies the assembly of the first unit of the clutch 401 because the retainers 416a need not constitute discrete parts which must be separately manufactured and individually connected to the pressure plate 404.

The retainers or detent members (such as 316a or 416a) need not always be mounted on the pressure plate (such as 304 or 404); they can be mounted on any axially movable element of the first unit of the respective friction clutch. Retainers analogous to 316a or 416a can be mounted on the inner end portions of the prongs of the diaphragm spring to cooperate with selected portions of the clutch plate to maintain the latter in an optimum axial position with reference to the cover as well as to center the clutch plate relative to the pressure plate. For example, retainers on two or more prongs of the diaphragm spring can engage suitable complementary detent members at the periphery of the hub of the clutch plate.

As shown in FIG. 6 by broken lines, the radially outermost portion of the illustrated segment 423 of the clutch plate 415 can be provided with a radially inwardly extending recess or notch 429a which receives a complementary radially inwardly extending projection or tooth (not referenced) of the centering portion 416b so as to establish a form-locking connection against uncontrolled angular movement of the clutch plate 415 and the pressure plate 404 relative to each other. When the clutch 401 is put to use and the pressure plate 404 (which rotates with the flywheel on the output shaft of the engine) turns relative to the clutch plate 415 (which is non-rotatably secured to the input element of the variable-speed transmission in the motor vehicle) and-/or vice versa, the centering portions 416b are destroyed or sheared off as a result of their form-locking connection with the respective segments 423 so that the parts 429 and 416b cannot interfere with rotation of the plates 404, 415 relative to each other.

The connection between a detent member or retainer 416a and the respective centering portion 416b, as well as the form-locking connection between each centering portion 416b and the respective segment 423, can be designed and dimensioned in such a way that the application of a certain torque to the clutch plate 415 and/or pressure plate 404 in a direction to turn one of these plates relative to the other plate results in separation (breaking or tearing away) of each centering portion 416b from the respective retainer 416a and the portions 416b are propelled substantially radially outwardly under the action of centrifugal force which develops when the plate 404 and/or 415 is set in rotary motion.

FIGS. 7 and 8 show a further friction clutch 501 wherein the two units are temporarily joined to each other by a different coupling device 516. The latter comprises several elastic female detent members or elements 528 each of which is an integral prong or claw of the cover 502 and tends to move its free end portion radially inwardly toward the axis of the clutch 501. Each prong 528 has a notch which is provided in its inner side and receives a male detent member 529 forming the radially outermost portion of the respective segment of the clutch plate 515. The diaphragm spring biases the pressure plate axially against the adjacent friction lining of the clutch plate 515 so that the male detent members 529 bear against the left-hand surfaces in the notches of the respective prongs 528 to thus prevent accidental separation of the clutch plate 515 from the unit including the cover 502. The prongs 528 then cooperate with the respective male detent members 529 to maintain the clutch plate 515 in an optimum axial position with reference to the cover 502 as well as to properly center the clutch plate 515 relative to the pressure plate of the friction clutch 501.

The flywheel 520 has a ring-shaped cam 522 which engages the radially outwardly extending tips or cam followers 521 of the prongs 528 when the cover 502 is in the process of being attached to the flywheel 520 whereby the cam 522 spreads the prongs 528 and disengages them from the respective male detent members 529 so that the clutch plate 515 is free to move axially relative to the cover 502. In other words, the coupling device 516 is deactivated in automatic response to attachment of the cover 502 of the first unit of friction clutch 501 to the flywheel 520.

It is clear that the notches in the inner sides of the prongs 528 can be replaced with inwardly extending projections in the form of teeth, claws or like parts which engage the left-hand sides of the respective detent members 529 in order to hold the clutch plate 515 at a desired axial distance from the cover 502 until the latter is properly affixed to the flywheel 520.

The cam 522 may but need not constitute a circumferentially complete bead around the friction surface of the flywheel 520.

The prongs 528 are preferably elastic and tend to flex radially inwardly so that they remain in engagement with the respective detent members 529 until and unless they are forced to move radially outwardly in response to engagement with the flywheel 520. The elasticity of the prongs 528 and their tendency to move the respective tips 521 radially inwardly exhibit the additional advantage that the male detent members 529 automatically snap into the notches of the respective prongs 528 when the clutch plate 515 is moved axially toward the cover of the clutch 501. In other words, it is not necessary to spread the prongs 528 apart by a separate spreading device because the male detent members 529 merely slide along the respective tips 521 and automatically find their way into the respective notches to thus complete the coupling of the clutch plate 515 to the cover of the clutch 501. Such snap type connection between the clutch plate 515 and the cover contributes to simplicity and lower cost of the coupling operation.

It is further clear that the coupling of the male detent members 529 to the prongs 528 can take place in a manner as described in connection with FIGS. 1 and 2, namely the detent members 529 can constitute an annulus of projections forming part of a bayonet mount and the prongs 528 constitute a second annulus of projections which can be bypassed by the projections 529 in at least one first angular position of the clutch plate 515 and the cover of the clutch 501 relative to each other. The clutch plate 515 is then turned to assume a different angular position in which the projections or detent members 529 extend into the notches of the respective prongs or projections 528.

Still further, it is within the purview of the invention to produce the prongs 528 as separate elements which are thereupon welded, riveted or otherwise secured to the cover of the clutch 501. It is even possible to separably connect the prongs 528 to the cover, e.g., by properly anchoring each separately produced prong in a suitable socket of the cover or in any other suitable way which does not necessitate the establishment of a more or less permanent connection between the prongs and the cover. The separately produced prongs can be made of an elastic material, such as spring steel.

In accordance with a further modification which is not shown in the drawing, the means for centering the clutch plate relative to the first unit of the friction clutch can comprise a first centering means on the clutch plate and a second centering means on or close to the radially innermost portion of the cover. For example, and referring to FIG. 1, the hub 17 or the disc 20 of the clutch plate 15 can be provided with a first centering means in the form of prongs, rods or like elements which engage the inner marginal portion 14 of the cover 2 to thereby center the clutch plate relative to the unit including the cover 2, diaphragm spring 5, pressure plate 4 and seats 6, 7. In fact, the entire coupling device 16 can be replaced with a coupling device which establishes a separable connection between the clutch plate 15 and the inner marginal portion 14 of the cover 2 in such a way that the clutch plate is held at an optimum axial distance from the cover 2 and that the clutch plate 15 is also accurately centered relative to the unit including the cover 2, i.e., so that the axis $31b$ coincides with or is closely adjacent the axis $31a$.

If the detent members 529 are omitted, the prongs or claws 528 can engage the marginal portions of the respective friction linings 525, 526.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch, particularly for attachment to a flywheel in a motor vehicle, comprising a rotary first unit including a cover, a pressure plate having a first side facing toward said cover and a second side adjacent the flywheel when the clutch is attached to the flywheel, resilient means reacting against said cover and arranged to bias said pressure plate, and means for nonrotatably but axially movably securing said pressure plate to said cover; a rotary second unit including a clutch plate adjacent the second side of said pressure plate; and means for separably coupling said units to each other, at least prior to attachment of the clutch to the flywheel, so that the axes of rotation of said units coincide or are closely adjacent one another and said units are permanently separable from each other during and subsequent to attachment to the flywheel, said coupling means including means for maintaining said clutch plate and said first unit in a predetermined axial position relative to each other.

2. The clutch of claim 1, wherein said coupling means comprises separable complementary first and second detent means respectively provided on said first and second units.

3. The clutch of claim 1, wherein said coupling means includes means for terminating the connection between said units in response to attachment of the clutch to the flywheel.

4. The clutch of claim 1, wherein said coupling means includes means for terminating the connection between said units in response to at least one of a plurality of circumstances arising subsequent to attachment of the clutch to the flywheel including the application of torque, temperature changes and axial stressing.

5. The clutch of claim 1, wherein said coupling means is arranged to undergo destruction in order to terminate the connection between said units.

6. The clutch of claim 1, wherein said coupling means comprises manually separable first and second portions respectively provided on said first and second units.

7. The clutch of claim 1, wherein said coupling means includes means for biasing said clutch plate axially toward said pressure plate.

8. The clutch of claim 1, wherein said maintaining means includes means for maintaining said clutch plate in a position of axial abutment against said pressure plate.

9. The clutch of claim 1, wherein said coupling means comprises means for form-lockingly connecting said clutch plate to said first unit.

10. The clutch of claim 1, wherein said coupling means comprises a first portion affixed to a part of said first unit, and a second portion provided on said clutch plate and bearing against said first portion under the action of said resilient means by way of said pressure plate.

11. The clutch of claim 10, wherein said clutch plate includes at least one friction lining and a support for said friction lining, said support extending beyond said lining in the radial direction of said clutch plate and including the second portion of said coupling means.

12. The clutch of claim 10, wherein said clutch plate has at least one friction lining which undergoes wear in actual use of the clutch as a result of repeated frictional engagement with the flywheel and/or pressure plate so that its thickness in the axial direction decreases, said first portion of said coupling means being maintained in a predetermined axial position with reference to said cover such that it is kept out of contact with said second portion in response to attachment of said first unit to the flywheel and irrespective of the extent of wear upon said friction lining.

13. The clutch of claim 1, wherein said cover includes an outer marginal portion and said coupling means comprises a first portion provided on the marginal portion of said cover and a second portion provided on said clutch plate and cooperating with said first portion to hold the clutch plate against axial movement away from said pressure plate.

14. The clutch of claim 1, wherein said coupling means includes a yoke carried by one of said units and overlapping the other of said units so as to limit the extent of axial movability of said clutch plate and said cover away from each other.

15. The clutch of claim 1, wherein said coupling means includes a portion which is rigid or integral with said cover.

16. The clutch of claim 1, wherein said coupling means comprises a bayonet mount.

17. The clutch of claim 16, wherein said bayonet mount comprises an annulus of slots provided on one of said units and an annulus of projections provided on the other of said units, at least one of said units being turnable relative to the other of said units between a first angular position in which said projections register with said slots and a second angular position in which said projections are out of register with said slots.

18. The clutch of claim 17, wherein projections are provided on said clutch plate and said slots are provided on said first unit, said first unit further comprising an annulus of second projections alternating with said slots, the projections of said clutch plate being located between said second projections and said pressure plate in the first angular position of said one unit.

19. The clutch of claim 17, wherein said slots are provided in said clutch plate and said coupling means further comprises second projections provided on said clutch plate and alternating with said slots.

20. The clutch of claim 19, wherein said resilient means is arranged to store energy in the axial direction of said units so as to bias said pressure plate toward said clutch plate and to thereby urge the projections of said one unit against said second projections in the second angular position of said at least one unit.

21. The clutch of claim 1, wherein said coupling means comprises a plurality of elastic first detent elements provided on said cover and said clutch plate has second detent elements cooperating with said first detent elements to releasably hold said clutch plate adjacent said pressure plate, said first detent elements being stressed radially outwardly during engagement with said second detent elements and said resilient means being arranged to bias said pressure plate against said clutch plate to thereby maintain said second detent elements in engagement with said first detent elements.

22. The clutch of claim 21, wherein the first detent elements are disengageable from said second detent elements in automatic response to attachment of said first unit to the flywheel at which time the flywheel moves the first detent elements radially outwardly and away from engagement with said second detent elements.

23. The clutch of claim 1, wherein said coupling means includes at least one coupling element provided on said clutch plate and engaging an axially movable part, particularly the pressure plate, of said first unit so as to hold the clutch plate against axial movement relative to said axially movable part and to simultaneously center said clutch plate relative to said first unit.

24. The clutch of claim 23, wherein said pressure plate has a friction surface and said coupling element is adjacent said friction surface, said coupling means further comprising retainer means provided on said pressure plate and engaging said coupling element to limit the extent of axial movability of said clutch plate relative to said pressure plate.

25. The clutch of claim 24, wherein said clutch plate includes at least one friction lining and a support for said lining, said coupling element being disposed on said support in or outwardly of said lining.

26. The clutch of claim 24, wherein said pressure plate includes a radially outwardly extending projection and said retainer means is provided on said projection.

27. The clutch of claim 26, wherein said securing means is connected to said projection.

28. The clutch of claim 23, wherein said coupling means further comprises a male component which extends into said coupling element.

29. The clutch of claim 28, wherein said coupling means comprises a plurality of hollow coupling elements on said clutch plate and a plurality of substantially pin-shaped male components each extending into one of said coupling elements.

30. The clutch of claim 28, wherein said clutch plate comprises a support, friction linings and means for connecting said linings to said support, said connecting means including said coupling element.

31. The clutch of claim 28, wherein said pressure plate has a bore and said male component is anchored in said bore.

32. The clutch of claim 28, wherein said pressure plate has a friction surface facing said clutch plate and said male component is bonded to said friction surface.

33. The clutch of claim 1, wherein at least a portion of said coupling means consists of a plastic material.

* * * * *